United States Patent [19]
Newton et al.
[11] Patent Number: 4,919,858
[45] Date of Patent: Apr. 24, 1990

[54] PROCESS FOR THE PRODUCTION OF A BONDED MAGNET

[75] Inventors: Thomas H. Newton, Cheshire, England; Tatsuya Shimoda, Nagano, both of Japan

[73] Assignees: Imperial Chemical Industries PLC, London, England; Seiko Epson Corporation, Tokyo, Japan

[21] Appl. No.: 276,842

[22] Filed: Nov. 28, 1988

[30] Foreign Application Priority Data

Nov. 27, 1987 [GB] United Kingdom ................ 8727851

[51] Int. Cl.[5] ........................ B29C 41/04; B29C 71/00

[52] U.S. Cl. ...................................... 264/24; 148/105; 148/108; 148/301; 148/302; 148/311; 264/104; 264/108; 264/114; 264/122; 264/210.2; 264/210.6; 264/211; 264/236; 264/311; 264/328.2; 264/DIG. 58

[58] Field of Search ................... 264/23, 24, 104, 108, 264/114, 122, 210.2, 210.6, 211, 236, 241, 310, 311, 323, 328.2, DIG. 58; 425/3, 425, 435, DIG. 33; 148/103, 105, 108, 120, 301, 302, 311; 335/296, 302

[56] References Cited

U.S. PATENT DOCUMENTS

| | | | |
|---|---|---|---|
| 3,365,351 | 1/1968 | Maaz et al. | 264/311 X |
| 3,849,213 | 11/1974 | Baermann | 148/108 |
| 3,985,588 | 10/1976 | Lyman | 148/103 |
| 4,123,297 | 10/1978 | Jandeska et al. | 148/103 |
| 4,250,128 | 2/1981 | Meckling | 264/24 |
| 4,327,346 | 4/1982 | Tada et al. | 335/296 |
| 4,604,042 | 8/1986 | Tanigawa et al. | 425/3 |

FOREIGN PATENT DOCUMENTS

| | | | |
|---|---|---|---|
| 55-98814 | 7/1980 | Japan | 335/296 |
| 271786 | 4/1971 | U.S.S.R. | 264/311 |

OTHER PUBLICATIONS

Abstracts of Japanese Patent Publications Nos. 59-094406; 60-216524; 61-059705; 60-220905; 60-220906; 60-206111; and 60-183705.

*Primary Examiner*—Jeffery Thurlow
*Assistant Examiner*—Leo B. Tentoni
*Attorney, Agent, or Firm*—Cushman, Darby & Cushman

[57] ABSTRACT

Production of a bonded magnet from a composition of a cross-linkable organic material and a particulate magnetic material by (1) placing in a mold a shaped composition in which the particles of magnetic material are optionally aligned and demagnetized,
(2) rotating the mold about an axis thereof,
(3) cross-linking the organic material in the shaped composition while rotating the mold,
(4) recovering from the mold a shaped article, and
(5) optionally remagnetizing the particles.

29 Claims, No Drawings

PROCESS FOR THE PRODUCTION OF A BONDED MAGNET

BACKGROUND OF THE INVENTION

This invention relates to a process for the production of a shaped article having magnetic properties in which particles of magnetic material are bonded together by means of an organic material. The invention thus relates to a process for the production of a so-called bonded magnet.

DESCRIPTION OF THE PRIOR ART

Bonded magnets which are produced from a composition comprising an organic material e.g. an organic polymeric material, and a particulate magnetic material, are well-known. Most commonly such magnets are produced commercially from a composition comprising a mixture of a thermoplastic organic polymeric material and a particulate magnetic material. For example, a composition comprising a mixture of thermoplastic organic polymeric material and particulate magnetic material may be shaped in plastics processing equipment, e.g. in an injection molder or in an extruder, or the composition may be processed by compression molding.

The composition is shaped while the thermoplastic organic polymeric material is in a fluid state and the composition is then cooled to a solid state. Optionally, while the organic polymeric material is in a fluid state, the composition may be subjected to the influence of a magnetic field in order to align the particles of magnetic material to the direction of easy magnetization and thus enhance the performance of the magnet. The magnetic field is maintained while the organic polymeric material is cooled to a solid state, and thereafter the thus shaped composition is removed from the influence of the magnetic field as, when the organic polymeric material is in a solid state, the magnetic field is no longer needed in order to maintain the alignment of the particles of magnetic material.

The thus produced shaped article is then removed from the plastics processing equipment.

The organic polymeric material in the composition used in the production of the bonded magnet may be a polyolefin, for example, polyethylene or polypropylene, but a particularly favored material for use in such a composition is a polyamide, that is one of the nylons. A particularly favored nylon is nylon 6. For example, Japanese Patent Publication No. 59 094406 describes a composition of a synthetic resin and a powdered magnetic material whose surface has been treated with a coupling agent. The magnetic material may be a ferrite or a rare-earth/cobalt intermetallic compound, and the synthetic resin may be polypropylene, polyvinyl chloride or a polyamide, e.g. nylon -6, nylon -11 or nylon -12. The use of polyamides, e.g. nylon -6 and nylon -6.6, in such compositions is also described in Japanese Patent Publication No. 60 216524 and in Japanese Patent Publication No. 61 059705.

Magnets produced from compositions in which the organic polymeric material is a thermoplastic such as a nylon or a polyolefin do, however, suffer from disadvantages, as do the processes used in production of the magnets. Thus, the glass transition temperatures of polyolefins and of the nylons may be relatively low such that at relatively low temperatures magnets made from compositions comprising polyolefins and the nylons may tend to distort and become misshapen, particularly under the influence of a strong magnetic field or as a result of repulsion between the aligned particles of magnetic material, with possible serious consequences for the equipment in which the magnet is installed. For example, the glass transition temperatures of nylon -6, nylon -11 and nylon -12 are respectively 62.5° C., 46° C. and 37° C. Thus, the effective upper limit of operation of such a magnet may be at a relatively low temperature, and in particular it may be at a temperature which is not as high as might be desired. Furthermore, it is necessary to process the composition at a temperature at which the organic polymeric material is in a fluid state, and the latter material may melt at a temperature which is so high that during the processing there is an adverse effect on the properties of the particles of magnetic material, e.g. as a result of oxidation. Also, in order to produce a bonded magnet having a high magnetic performance it is necessary to use a composition containing a high proportion of particles of magnetic material. Such a composition may have a high viscosity when it is subjected to plastics processing, and it may be difficult if not impossible to shape a composition containing the desired high proportion of particulate magnetic material. Excessively high temperatures may also be needed in order that the organic polymeric material shall be in a sufficiently fluid state that the composition can be shaped, with possible adverse effects on the properties of the particles of magnetic material.

Magnets made from compositions which comprise an organic material and which have a reduced tendency to distort at high temperatures and which thus may be operated at higher temperatures may be made from compositions in which the organic material is a cross-linkable or curable organic material, e.g. a thermosetting resin. In the production of magnets from such a composition a composition comprising a cross-linkable organic material, optionally an additive capable of effecting or assisting cross-linking of the material, and a particulate magnetic material, is shaped on plastics processing equipment at a temperature at which the organic material is in a fluid state, the organic material is cross-linked, and the bonded magnet comprising particulate magnetic material and a solid cross-linked organic material is recovered.

When the organic material is in a fluid state the composition may be subjected to a magnetic field in order to align the particles of magnetic material to the direction of easy magnetization and thus enhance the performance of the magnet. In this case the influence of the magnetic field is maintained until sufficient cross-linking has been effected that the composition has solidified at least to the extent that the aligned particles are able to retain their alignment when the magnetic field is removed. The magnetic field is then removed, if necessary the cross-linking reaction is completed, and the bonded magnet is recovered. If the influence of the magnetic field was not maintained while the organic material in the composition was still in a fluid state the particles of magnetic material would become misaligned due to repulsion between adjacent particles in the fluid composition.

Examples of the production of bonded magnets from compositions comprising a cross-linkable organic material are provided by Japanese Patent Publication No. 60 220905 which describes the production of a bonded magnet from a composition which comprises an epoxy resin, a rare-earth magnetic powder, and an aliphatic carboxylic ester as a lubricant, by Japanese Patent Publication No 60 220906 which describes the production of a bonded magnet from a composition which comprises an epoxy resin, a rare-earth magnetic powder, and an aliphatic carboxylic acid amide as a lubricant, by Japanese Patent Publication No. 60 206111 which describes, in a specific example, the production of a bonded magnet from a composition which comprises a bisphenol A novolak epoxy resin, optionally a liquid diluent, and a magnetic powder of an intermetallic compound of samarium and cobalt, and by Japanese Patent Publication No. 60 183705 which describes the production of a bonded magnet from a composition of a ferrite magnetic powder, which has been treated with a surfactant, and an unsaturated liquid polyester resin.

The cross-linked material in the bonded magnet will generally have a high glass transition temperature and a bonded magnet produced from such a composition has the advantageous property that it may generally be safely operated at a substantially higher temperature than that at which a bonded magnet produced from a composition comprising a thermoplastic organic polymeric material may be operated. However, the production of magnets from such compositions does suffer from disadvantages. Thus, the magnetic materials in such compositions may be expensive, as is the case for example with ferrites and with some intermetallic compounds of rare earth metals and transition metals, and it is particularly desirable that the composition in a defective molding, or any of the composition which is normally wasted, e.g. that part of the composition in the sprues and runners of an injection molding machine or the flash which is squeezed out of a compression mold, should be reprocessable. However, where the organic material in the composition in a defective molding or in the flash or the like has been cross-linked it cannot be reprocessed on plastics processing equipment and thus the expensive magnetic material in the defective molding or in the flash or the like is effectively wasted. Furthermore, in the production of a magnet from a such a composition the rate of production is determined by the speed of the cross-linking reaction and by the necessity of maintaining the composition in a mold, e.g in the die of an extruder, until the cross-linking reaction has proceeded to the extent that the composition is able to retain its shape on removal from the mold. Also, where a magnetic field is applied during the process in order to align the particles of magnetic material to the direction of easy magnetization, the composition must be retained under the influence of the magnetic field until the amount of cross-linking which has been effected is sufficient to result in a solidified composition, that is until the composition has solidified the extent that the aligned particles of magnetic material are able to retain their alignment when the magnetic field is removed. This cross-linking reaction takes a finite time, indeed, it may take several minutes for the necessary amount of cross-linking to be affected, and the productivity of the process is severely limited. It is also inconvenient and economically disadvantageous to be required to maintain the magnetic field for such a period of time.

SUMMARY OF THE INVENTION

The present invention provides a process for the production of a shaped article having magnetic properties from a composition which comprises a cross-linkable organic material and a particulate magnetic material, in which that part of the composition in a defective molding or that part which is normally wasted in the production of the shaped article may be reprocessed, in which it is unnecessary to maintain the influence of the magnetic field during the cross-linking reaction in order to maintain the alignment of the particles of magnetic material, in which the productivity of the process is much greater than that of the known processes as described herein, and in which it is possible, for example by extrusion, to produce bonded magnets having a substantial length, e.g. magnets in the form of a long cylinder.

According to the present invention there is provided a process for the production of a shaped article having magnetic properties from a shaped composition which comprises a mixture of a cross-linkable organic material, a particulate magnetic material, and optionally an additive which is capable of effecting or assisting cross-linking of the organic material, the process comprising (1) placing the shaped composition in a mold, (2) rotating the mold about an axis thereof, (3) cross-linking the organic material in the shaped composition while rotating the mold, and (4) recovering from the mold a shaped article which comprises a mixture of a cross-linked organic material and a particulate magnetic material.

The shaped composition which is placed in the mold in step (1) of the process may itself be produced by (a) shaping the composition in a mold at a temperature at which the composition is in a fluid state, and (b) cooling the thus shaped composition so as to solidify the composition and produce a shaped composition which is shape-retaining.

The bonded magnet comprising a mixture of cross-linked organic material and particulate magnetic material which is produced in the aforementioned process is an isotropic magnet. An anisotropic magnet, of enhanced magnetic performance, may be produced by a modified process which comprises:

(1) placing in a mold a shaped composition as described but in which the particles of magnetic material have been aligned to the direction of easy magnetization and in which the particles are demagnetized, (2) rotating the mold about an axis thereof, (3) cross-linking the organic material in the shaped composition while rotating the mold, and (4) recovering from the mold a shaped article which comprises a mixture of a cross-linked organic material and a particulate magnetic material.

The shaped composition which is placed in a mold in step (1) of this modified process may itself be produced by (a) shaping the composition in a mold at a temperature at which the composition is in a fluid state and applying a magnetic field to align the particles of magnetic material to the direction of easy magnetization, (b) cooling the thus shaped composition so as to solidify the composition and produce a composition which is shape-retaining and maintaining the magnetic field until the composition is no longer in a fluid state, and (c) demagnetizing the particles of magnetic material in the thus shaped composition.

DESCRIPTION OF PREFERRED EMBODIMENTS

In the process which comprises steps (a) and (b), or steps (a), (b) and (c), and in which there is produced a shaped composition comprising a mixture of cross-linkable organic material and a particulate magnetic material, which particulate magnetic material may or may not be aligned to the direction of easy magnetization, the shaping step (a) is operated at elevated temperature. The shaping step may be effected rapidly, and provided that the composition is maintained at elevated temperature for a relatively short time in step (a) of the process prior to solidification of the composition in step (b) of the process the amount of cross-linking of the organic material which takes place in step (a), if any, will only be very small with the result that the composition in a defective molding or in that part of the composition which is normally wasted, e.g. the composition in the sprues and runners of an injection molding machine and the flash which is squeezed out of a compression mold, may be re-used in the process. There is little or no wastage of expensive magnetic material in the composition. Furthermore, as the shaping and cooling steps (a) and (b) may be effected rapidly, and as it is unnecessary during the cross-linking reaction to retain the shaped composition in the mold in which the composition was initially shaped, the productivity of the process is very greatly increased. Also, in the embodiment of the process in which the magnetic particles in the shaped composition have been aligned it is not necessary to maintain the magnetic field while the cross-linking reaction takes place. In step (b) the shaped composition is cooled in order to solidify the composition and in the cooled and shaped composition the composition is capable of retaining its shape and thus of maintaining the alignment of the particles without the need to maintain the influence of the magnetic field. It is necessary to maintain the magnetic field only for the short period of time which is required to shape the composition and to cool the shaped composition to the solid state.

In step (a) the composition is shaped in a mold at a temperature at which the composition is in a fluid state, and in step (b) the thus shaped composition is cooled in order to solidify the composition. This shaping step, and the optional alignment of the particles of magnetic material, may be effected on any suitable plastics processing equipment, for example in an extruder, in an injection molder, or by compression molding.

In effecting the shaping step in an extruder the composition is charged to the extruder, the composition is heated in order to convert the composition to a fluid state, the composition is extruded through a suitable die, the composition is cooled near the exit from the die in order to solidify the composition to a state at which it retains its shape, and the shaped composition is removed from the die. Where it is desired to produce an anisotropic magnet the composition in the die of the extruder is subjected to the influence of a magnetic field while the composition is in a fluid state and the particles of magnetic material are aligned to the direction of easy magnetization. The magnetic field may be an electromagnet positioned adjacent to the die of the extruder. In effecting the shaping step the temperature should not be excessively high and the time for which the composition is in a fluid state should be relatively short so that little, if any, cross-linking of the organic material takes place at this stage so that defective moldings and waste composition can be reprocessed. Extrusion is a particularly suitable shaping technique for producing cylindrical magnets, which may be of substantial length in view of the increased production rate which is characteristic of the present process. The magnets may be in tubular form, e.g. in the form of a thin-walled tube.

The shaping step, and the optional alignment of the particles of magnetic material, may similarly be effected in an injection molder having a suitably shaped mold into which the composition is injected when the composition is in a fluid state. If desired a magnetic field may be positioned adjacent to the mold in order to align the particles of magnetic material to the direction of easy magnetization.

In this case the shaped composition is cooled in the mold of the injection molder and the thus shaped composition is removed from the mold.

The composition may be shaped by compression molding in which in step (a) the composition is charged to a suitably shaped mold and the composition is heated to convert the composition to a fluid state and the composition is compressed in the mold. A suitable magnetic field may be placed adjacent to the mold in order to align the particles of magnetic material, and in step (b) the shaped composition is cooled in the mold and the solidified shaped composition is removed from the mold.

Where the shaping step (a) is carried out under the influence of a magnetic field the field is applied so that the particles of magnetic material are aligned to the direction of easy magnetization and it is necessary to cool the shaped composition under the influence of the magnetic field and to maintain the magnetic field until the composition has cooled and has solidified at least to the extent that the influence of the magnetic field is no longer necessary in order to maintain the alignment of the particles of magnetic material.

Where the particles of magnetic material have been so aligned a further step (c) is carried out in which the particles of magnetic material in the shaped composition are demagnetized. This demagnetization may be effected by subjecting the shaped composition to a series of decreasing alternating magnetic fields.

In steps (1) and (2) of the process of the invention the shaped composition produced as hereinbefore described is placed in a mold and the mold is rotated about an axis thereof. During the rotation, and where the composition becomes fluid during the cross-linking step (3) of the process, the centrifugal force caused by rotation of the mold causes the shaped composition to bear on the surface of the mold and causes the shape of the composition to be maintained even where the composition becomes fluid. Where the particles of magnetic material in the composition have been aligned to the direction of easy magnetization this alignment is maintained even when the composition is in a fluid state as the particles have been demagnetized and thus there is no repulsion between adjacent particles which might lead to loss of alignment. In this latter case it may not be necessary to demagnetize the particles of magnetic material completely, but they must be demagnetized at least to the extent that in the cross-linking step (3) which is effected in the process of the invention there is at most only a small amount of repulsion between aligned particles when the composition is in a relatively fluid state during the initial stages of the cross-linking reaction.

The process of the invention is particularly suitable for use in the production of magnets of annular shape, for example, a magnet in the shape of a cylinder, e.g. a hollow cylinder, or a ring. For example, in the production of a magnet having a cylindrical shape the shaped composition may be placed in a cylindrical mold and the mold may be rotated about the axis of the cylinder and the organic material in the composition may be cross-linked during the rotation. The shape of the cylindrical composition is maintained by the centrifugal force which causes the composition to bear on the surface of the cylindrical mold, the shape being maintained even in the case where the composition is in a fluid state prior to cross-linking of the organic material. Lateral spread of the composition, if any, when the composition is in a fluid state may be prevented by radial barriers in the cylindrical mold. For ease of assembly and disassembly the cylindrical mold may be in two semi-cylindrical sections.

In step (3) of the process the organic material in the shaped composition is cross-linked while the mold is rotated. In general, the cross-linking will be effected at elevated temperature at which the organic material in the composition is liquid and at which the composition is relatively fluid, and at which the additive, which will generally be present in the composition, is activated and effects or assists cross-linking.

The speed of rotation of the mold may be selected by means of a simple experiment and will be determined at least by the fluidity of the composition in the initial stages of the cross-linking reaction, and on the shape of the composition. For example, where the shaped composition is in a cylindrical form and the shaped composition is positioned in a cylindrical mold the speed of rotation is desirably selected so as to result in little or no lateral spread of the shaped composition in the initial stages of the cross-linking reaction when the composition is fluid, although such lateral spread, if any, may be controlled by means of radial barriers in the cylindrical mold.

The shaped article which is recovered in step (4) of the process of the invention comprises a cross-linked organic material and a particulate magnetic material.

In an optional step (5) of the process of the invention the particles of magnetic material in the shaped article which is recovered in step (4) of the process may be magnetized by subjecting the shaped article to an applied magnetic field.

The process of the invention provides substantial flexibility in the design of magnets, and magnets of simple shape or of complex shape may be produced. Magnets made from the composition used in the process of the invention are light in weight and may, for example have a weight which is only about two thirds of the weight of a metallic magnet of corresponding size. The magnets produced by the process are also less brittle than are ceramic magnets.

The magnets may be used in many applications, for example in motors, TV sets, in printers and in latching devices, e.g. latching devices on doors.

The organic material which is present in the composition may be a liquid, particularly a viscous liquid, at ambient temperature. However, the organic material in the composition is preferably a solid material at ambient temperature so that the shaped composition of cross-linkable organic material and particulate magnetic material, which is used in the process of the invention, will be particularly well able to retain its shape at ambient temperature.

The organic material in the composition may be an organic monomeric material, or it may be an organic polymeric material. The composition may comprise two or more different organic materials; for example the composition may comprise a mixture of two or more organic monomeric materials, or a mixture of two or more organic polymeric materials, or a mixture of one or more organic monomeric materials and one or more organic polymeric materials.

In order to assist cross linking the organic material may suitably comprise ethylenic unsaturation and it may contain more then one ethylenically unsaturated group.

In the composition the organic material is preferably a solid material which is melt processable. In general the organic material will be solid at or about ambient temperature of 25° C., and be melt-processable at a higher temperature.

Thus, where the organic material in the composition is a monomeric material it preferably has a molecular weight which is sufficiently high that the organic material is solid at ambient temperature. The unsaturated group, and preferably a plurality of such groups as the presence of such groups assists the cross-linking reaction. Examples of suitable organic monomeric materials include $H_2C{=}CH{-}CH_2{-}NH{-}CO{-}NH{-}CH_2{-}CH{=}CH_2$, 9-vinyl carbazole,

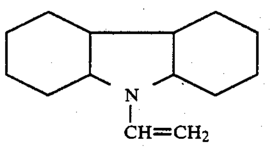

penta erythritol tetramethacrylate $C(CH_2{-}O{-}CO{-}C(CH_3){=}CH_2)_4$, 3,9-divinyl-2,4,8,10 tetraoxa spiro (5,5) undecane,

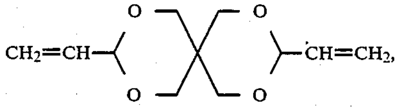

an adduct of 4,4' diphenyl methane diisocyanate and hydroxy ethyl methacrylate,

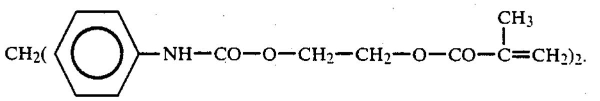

Example of curable organic polymeric materials which are solid but which are melt processable include ethylenically unsaturated polyester resins and epoxy resins.

Example of suitable epoxy resins include epoxidised bisphenol A:

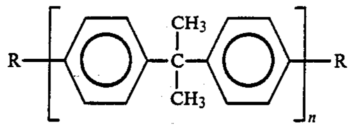

and epoxidised phenol formaldehyde novolak:

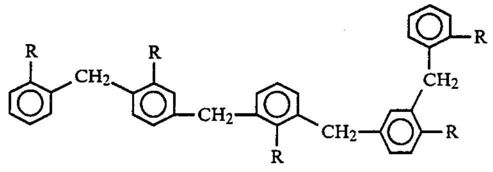

in which

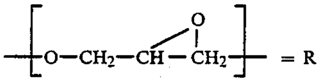

The epoxy resin may contain a suitable hardener which comprises a plurality of hydroxyl groups. An example of a suitable hardener is a phenol-formaldehyde novolak:

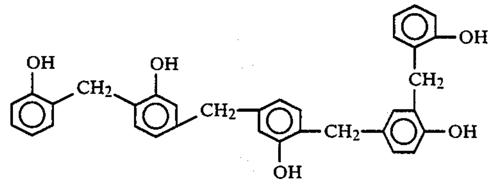

The composition may contain, and preferably does contain, an additive which is capable of effecting or assisting cross-linking of the organic material in the composition, although cross-linking may be effected in the absence of such an additive, for example, by subjecting the composition to ionising radiation, e.g. $\gamma$-rays. Suitable such cross-linking additives include free-radical generators e.g. peroxides and azo compounds, for example azo-bis-iso butyronitrile, especially where the organic material contains ethylenically unsaturated groups, for example, where the organic material is a polyester resin or where it is an acrylic material. Where the organic material is an epoxy resin it may contain an additive which catalyses reaction between the epoxy resin and hardener.

Where the composition contains an additive capable of effecting or assisting cross-linking care should be exercised in choosing the combination of organic material and additive. Thus, in the aforementioned step (a) in which the composition is shaped whilst the composition is in a fluid state the shaping step will generally be effected at elevated temperature and, while the composition is in this fluid state the amount of cross-linking, if any, which is effected is desirably kept to a minimum, or at least the amount of cross-linking is not such as to prevent subsequent re-processing of the shaped composition. Where the composition contains such a cross-linking additive an additive should be chosen whose activity is such that it does not effect such an undesirable amount of cross-linking during the shaping step. The additive which is chosen will of course depend on the organic material in the composition, and in particular on the temperature at which the composition becomes sufficiently fluid for it to be shaped. Indeed, an additive which is suitable for use in a composition with one organic material may be quite unsuitable for use in a composition with a different organic material which is sufficiently fluid, and thus is capable of being shaped, only at a higher temperature as, at the higher temperature, an unacceptably high proportion of cross-linking of the latter organic material may take place during the shaping step. Suitable combinations of organic material and additive may be selected from a knowledge of the melt processing characteristics of the organic material and of the thermal decomposition characteristics of the additive. However, by way of example, suitable combinations of additives and organic materials include 3,9-di vinyl -2,4,8,10- tetraoxaspiro (5,5) undecane which melts at 42° C. and azo-bis-isobutylonitrile which dissociates to form radicals at a temperature in excess of about 70° C., and 9-vinyl carbazole which melts at 65° C. and azo-bis-dicyclohexane carbonitrile which dissociates to form radicals at a temperature in excess of about 90° C.

By "magnetic material" we mean a material which is magnetic or which is capable of being magnetized. Thus, the magnetic material may not itself be magnetic but it may be magnetized under the influence of an applied magnetic field, for example when the composition is processed.

While there is no particular limit on the maximum size of the particles of magnetic material the particles suitably have a size in the range 0.5 micron to 200 microns.

Examples of suitable magnetic materials include ferrite materials, e.g. barium hexa ferrite ($Ba_{0.6}Fe_2O_3$) and strontium hexa ferrite ($Sr_{0.6}Fe_2O_3$). Other magnetic materials which may be used in the process of the invention and from which bonded magnets having high magnetic performance may be produced include intermetallic compounds formed from at least one rare-earth metal and at least one transition metal. Rare earth metals from which such a magnetic material may be formed include Sm, Ce, La, Y, Nd, Pr and Gd, and suitable transition metals include Fe, Co, Ni, Zr, Hf, Cu and Ti. The intermetallic compound may, for example, have an empirical formula which may generally and approximately be referred to as $RCo_5$ or $R_2Co_{17}$, where R is at least one rare earth metal. An example of a rare earth metal from Which the intermetallic compound may be produced is Sm, for example as in the intermetallic compounds which are generally and approximately referred to by the empirical formulae $SmCo_5$ and $Sm_2Co_{17}$. These latter empirical formulae are not intended to represent exact chemical formulae for the intermetallic rare-earth transition metal compounds as elements other than Sm and Co may be present in the intermetallic compounds.

By way of example, Japanese Patent Publication No 60 227408 refers to a rare-earth transition metal intermetallic compound having the formula Sm($Co_{0.672}Cu_{0.0}$-

$_{8}Fe_{0.22}Zr_{0.128})_{5.3}$ and Japanese Patent Publication No 60 220905 to rare-earth transition metal compounds having formulae $Sm(Co_{0.672}Cu_{0.08}Fe_{0.22}Zr_{0.028})_{8.35}$, $Sm_{0.75}Y_{0.25}(Co_{0.65}Cu_{0.05}Fe_{0.28}Zr_{0.02})_{7.8}$, and $Sm_{0.81}Ce_{0.19}(Co_{0.61}Cu_{0.06}Fe_{0.31}Zr_{0.02})_{7.6}$. Other examples of magnetic materials which are intermetallic compounds of at least one rare-earth metal and at least one transition metal include those based on Nd-Fe-B, for example, $Nd(Fe_{0.905}B_{0.095})_{5.67}$ which is also disclosed in Japanese Patent Publication No 60 220905. Other examples of such intermetallic compound magnetic materials include $Sm(Co_{0.67}Cu_{0.08}Fe_{0.22}Zr_{0.03})_{7.6}$, $Sm(Co_{0.074}Cu_{0.10}Fe_{0.15}Ti_{0.01})_{7.2}$, $Sm(Co_{0.69}Cu_{0.10}Fe_{0.20}Hf_{0.01})_{7.0}$, $Sm_{0.5}Pr_{0.5}Co_{5}$, $Ce(Co_{0.69}Cu_{0.12}Fe_{0.18}Zr_{0.01})_{6.0}$, $Sm_{0.5}Nd_{0.4}Ce_{0.1}(Co_{0.672}Cu_{0.0.8}Fe_{0.22}Zr_{0.03})_{8.35}$, and $Nd_{14}Fe_{81}B_{5}$.

The composition may of course contain more than one organic material, more than one particular magnetic material, and/or more than one additive capable of effecting or assisting cross-linking of the organic material.

In the composition the proportions of organic material, of additive capable of effecting or assisting cross-linking, if present, and of particulate magnetic material, may be varied between wide limits. In general. the proportion of magnetic material will be as high as possible, consistent with the composition being processable on plastics processing equipment, in order that the magnetic performance of the bonded magnet which is produced may be as high as possible. In general, the proportion of magnetic material in the composition will be at least 50% by weight of the composition, preferably at least 80% by weight of the composition. A suitable range for the proportion of the magnetic material is 80 to 95% by weight of the composition.

The amount of organic material in the composition should be such as to result in a composition which is melt-processable on plastics processing equipment, and in general the composition will contain at least 5% of organic material by weight of the composition. A suitable proportion of organic material is in the range 5 to 20% by weight of the composition.

The amount of additive which is capable of effecting or assisting cross-linking will depend to some extent at least on the nature of the additive and on the nature of the organic material, but an amount of additive in the range of 0.01% to 5% by weight of the composition will generally suffice. Where the organic material contains ethylenically unsaturated groups, as in a polyester resin or in an acrylic material, and the additive is a free-radical generator, an amount of additive in the range 0.01% to 2% by weight of the composition will generally suffice. Where the organic material is an epoxy resin the amount of additive will generally also be in the range 0.01% to 2% by weight of the composition.

The greater is the amount of such additive in the composition the faster will be the cross-linking of the organic material.

The components of the composition may be mixed by any convenient means. For example, the components may be mixed in any suitable equipment for blending particulate material. A preferred manner of forming a particularly homogeneous composition of the organic material and the particulate magnetic material is to mix the composition under conditions of high shear, for example, on a twin roll mill at an elevated temperature at which the organic material is heat-softened. The mixture may be passed repeatedly throughout the nip between the rolls of the mill, and finally, and if desired, the additive which is capable of effecting or assisting cross-linking, may be added to the mixture on the mill. This is a particularly convenient means of mixing the components of the composition when the additive itself is liquid. The mixing of the additive should be effected relatively rapidly so that little if any cross-linking of the organic material is effected during the mixing, and for this reason the additive is preferably added at the end of the mixing process.

In an alternative method the components of the composition may be mixed in the presence of a liquid diluent which is subsequently removed from the composition. The liquid diluent assists in producing a homogenous mixture of the components of the composition and it may be removed from the composition, for example, by evaporation, particularly when the diluent is a low boiling liquid.

Where the organic material in the composition is a monomeric material, and even where it is a polymeric material, mixing of the components of the composition, and in particular the formation of a homogenous mixture, and the subsequent processing of the composition, may be assisted by including in the composition a proportion of, and generally a small proportion of, a polymeric material which is soluble in or dispersible in the organic material when the organic material is in a fluid, or liquid, state. The presence of a small proportion of such a polymeric material also assists in the formation of a composition which contains a high proportion of particulate magnetic material and which is also processable on plastics processing equipment. The polymeric material will generally be a co-polymer containing some functional groups which have an affinity for the magnetic particles. The polymeric material may promote the wetting of the particles by the organic material. Suitable polymeric materials include polyvinyl butyral/polyvinyl alcohol co-polymer, polyvinyl chloride/polyvinyl acetate/polyvinyl alcohol co-polymer, polyvinyl acetate/polycrotonic acid co-polymer, and polyvinylidene chloride/polyacrylonitrile co-polymer. The composition suitably contains from 0.5% to 5% by weight of such polymeric material. The composition may contain more than one such polymeric material.

The invention is illustrated by the following examples and comparative examples in which all parts are expressed as parts by weight.

EXAMPLE 1

A composition of

Magnetic particles: $Sm(Co_{0.672}Fe_{0.22}Cu_{0.08}Zr_{0.028})_{8.35}$ powder 91.47 parts Organic material: Oligomerised and epoxidised bisphenol A powder 5.05 parts, phenol-formaldehyde novolak powder 1.70 parts, Polymeric material: A powder of a copolymer containing units of vinyl butyral and vinyl alcohol - Pioloform BN 18 - Wacker Chemie GmbH, 1.26 parts, Silica powder (Aerosil OX 50) 0.2 parts Calcium stearate 0.16 parts Bleached Montan wax 0.16 parts was mixed by hand to form a reasonably homogenous mixture of the powders and the mixture was then charged to a twin-roll mill, the rolls of which were at a temperature of 90° C., at which temperature the organic material was in liquid form. The composition was passed repeatedly through the rolls of the mill to form a plastic-like sheet. The presence of the organic polymer powder in the composition assisted in the production of a sheet on the rolls of the mill.

The sheet was granulated and the granules were charged to a screw extruder and extruded therein at a temperature of 130° C. The composition was extruded through a die which formed the composition into a hollow cylinder of outside diameter 30 mm and wall thickness of 0.5 mm. During the extrusion a zone of the extrusion die was subjected to a radial magnetic field of 12 kG in order to align the particles of magnetic material while the organic material of the composition was in a liquid state and the composition was fluid. A further zone of the extrusion die was cooled in order to solidify the organic material of the composition, and the magnetic field was maintained along this further zone until the organic material had solidified to the extent that the alignment of the particles of magnetic material in the resultant cylinder was maintained in the absence of the magnetic field. The cylinder was recovered from the die of the extruder.

The particles of magnetic material in the cylinder were demagnetized by subjecting the cylinder to a series of decreasing alternating magnetic fields and the cylinder containing the now demagnetized particles was placed within a cylindrical metal mold having an internal diameter of 30.1 mm. The metal mold was rotated at 250 revolutions per minute and heated at a temperature of 200° C. for 40 minutes, and the mold and contents were then cooled to ambient temperature, the rotation stopped, and the cylinder removed from the mold. The organic material in the cylinder had been cross-linked. The particles of magnetic material in the cylinder, which had retained its original shape, were then remagnetized by subjecting the cylinder to a magnetic field.

COMPARATIVE EXAMPLES 1,2 AND 3

In three comparative examples the procedure in the above example was repeated except that in Comparative Example 1 the demagnetization and heating, rotation and remagnetization procedures were omitted, that is, the organic material in the composition was not heated to cross-link the material, in Comparative Example 2 the particles in the cylinder recovered from the extruder were not demagnetized prior to rotating and heating the cylinder in the cylindrical metal mold, and the final magnetization stage was omitted, and in Comparative Example 3 the cylinder was placed in the cylindrical mold and heated at 200° C. for 40 minutes but the cylindrical mold was not rotated. The cylinder removed from the the mold in comparative Example 3 was substantially mis-shapen.

The magnetic properties of the cylinders produced in the Examples were as follows:

| EXAMPLE | MAGNETIC ENERGY PRODUCT, MG Oe |
|---|---|
| 1 | 4.6 |
| Comparative 1 | 4.6 |
| Comparative 2 | 3.1 |
| Comparative 3 | — |

Comparison between these results indicates that the magnetic energy product in the cylinder before and after cross-linking of the organic material in the composition is initially the same indicating that rotation in a mold causes no misalignment of the particles of magnetic material in the cylinder during the cross-linking reaction (Comparative Example 1), and that where the particles are not demagnetized repulsion between adjacent particles during cross-linking of the organic material in the rotating mold results in a substantial decrease in the magnetic energy product (Comparative Example 2).

EXAMPLE 2

A composition of

| | | |
|---|---|---|
| Magnetic particles: | $Nd_{14}Fe_{81}B_5$ | 93.30 parts |
| Organic material: | Oligomerised and epoxidised bisphenol A powder | 4.13 parts |
| | Phenol-formaldehye novolak powder | 2.29 parts |
| | Epoxidised phenol-formaldehyde novolak powder | 0.33 parts |
| Polymeric material: | A powder of a copolymer containing units of vinyl butyral and vinyl alcohol - Pioloform BN 18- Wacker Chemie GmbH | 1.26 parts |
| | Silica powder (Aerosil OX 50) | 0.2 parts |
| | Calcium streate | 0.17 parts |
| | Bleached Monton wax | 0.17 parts |
| | Diuron | 0.05 parts |

was mixed b y hand to form a reasonably homogenous mixture of the powders and the mixture was then charged to a twin-roll mill, the rolls of which were at temperature of 90° C., and the composition was passed repeatably through the nip between the rolls of the mill to form a plastic sheet. The presence of the organic polymer in the composition assisted in the production of a sheet on the rolls of the mill.

The sheet was granulated and the granules were charged to an injection molder and injected into a mold which formed the composition into a ring of outside diameter 22 mm and wall thickness of 1 mm. The temperature of the mold was 40° C. The shaped composition was cooled and removed from the mold.

The ring was placed within a cylindrical metal mold having internal diameter of 22.05 mm.

The metal mold was rotated at 250 revolutions per minute and heated at a temperature of 200° C. for 40 minutes, and the mold and contents were then cooled to ambient temperature, the rotation stopped, and the ring removed from the mold. The ring had retained its original shape.

The magnetic properties of the ring produced in this example were as follows:

| Remanence Br (KG) | Coercivity bHc (KOe) | Energy product (BH) max (MGOe) |
|---|---|---|
| 5.03 | 4.41 | 5.5 |

We claim:

1. A process for the production of a shaped article having magnetic properties from a shaped composition which comprises a mixture of a cross-linkable organic material and a particulate magnetic material, which process comprises (1) placing the shaped composition in a mold, (2) rotating the mold about an axis thereof, (3) cross-linking the organic material in the shaped composition while rotating the mold, and (4) recovering from the mold a shaped article which comprises a mixture of a cross-linked organic material and a particulate magnetic material.

2. A process as claimed in claim 1 in which the shaped composition is produced by (a) shaping the composition in a mold at a temperature at which the composition is in a fluid state, and (b) cooling the thus shaped composition so as to solidify the composition and produce a shaped composition which is shape retaining.

3. A process as claimed in claim 1 in which step (1) of the process comprises placing in a mold a shaped composition in which the particles of magnetic material have been aligned to the direction of easy magnetization and in which the particles have been demagnetized

4. A process as claimed in claim 3 in which the shaped composition is produced by (a) shaping the composition in a mold at a temperature at which the organic material is in a fluid state and applying a magnetic field to align the particles of magnetic material to the direction of easy magnetization, (b) cooling the thus shaped composition so as to solidify the composition and produce a composition which is shape retaining and maintaining the magnetic field until the composition is no longer in a fluid state, and (c) demagnetizing the particles of magnetic material in the thus shaped composition.

5. A process as claimed in any one of claims 1 to 4 in which the composition of cross-linkable organic material and particulate magnetic material is shaped by extrusion, by injection molding or by compression moulding.

6. A process as claimed in claim 5 in which the composition is shaped into an annular shape.

7. A process as claimed in claim 6 in which the composition is shaped into a cylindrical shape.

8. A process as claimed in claim 7 in which the mold into which the shaped composition is placed in step (1) of the process has a cylindrical shape.

9. A process as claimed in claim 1 in which in step (3) of the process the organic material is cross-linked by heating at elevated temperature.

10. A process as claimed in claim 1 in which in the composition the organic material is solid at ambient temperature.

11. A process as claimed in claim 1 in which the organic material is a monomeric material.

12. A process as claimed in claim 1 in which the organic material is a polymeric material.

13. A process as claimed in claim 11 or claim 12 in which the organic material comprises a plurality of ethylenically unsaturated groups.

14. A process as claimed in claim 12 in which the polymeric material comprises an epoxy resin.

15. A process as claimed in claim 1 in which the composition comprises an additive which is capable of effecting or assisting cross-linking of the organic material.

16. A process as claimed in claim 15 in which the organic material comprises a plurality of ethylenically unsaturated groups and in which the additive is a free-radical generator.

17. A process as claimed in claim 1 in which the magnetic material has a particle size in the range 0.5 to 200 microns.

18. A process as claimed in claim 1 in which the particulate magnetic material comprises an intermetallic compound of at least one rare earth metal and at least one transition metal.

19. A process as claimed in claim 18 in which the transition metal is or comprises Co.

20. A process as claimed in claim 19 in which the magnetic material has an approximate empirical formula $RCo_5$ or $R_2Co_{17}$ where R is at least one rare earth metal.

21. A process as claimed in claims 18 in which the rare-earth metal is or comprises Sm.

22. A process as claimed in claim 18 in which the particulate magnetic material comprises an intermetallic compound comprising Nd-B-Fe.

23. A process as claimed in claim 1 in which the composition contains at least 80% by weight of particulate magnetic material.

24. A process as claimed in claim 1 in which the composition contains at least 5% by weight of organic material.

25. A process as claimed in claim 15 24 in which the composition contains from 0.01 to 2% by weight of additive.

26. A process as claimed in claim 1 in which the composition contains a polymeric material which is soluble in or dispersible in the organic material when the organic material is in a liquid state.

27. A process as claimed in claim 26 in which the composition contains from 0.5 to 5% by weight of polymeric material.

28. A process as claimed in claim 1 in which the composition is mixed under conditions of high shear.

29. A process as claimed in claim 1 in which in a step (5) of the process the particles of magnetic material in the shaped article which is recovered in step (4) of the process are subjected to an applied magnetic field.

* * * * *